(12) United States Patent
Yoo (10) Patent No.: US 8,829,831 B2
(45) Date of Patent: Sep. 9, 2014

(54) PARAMETER ESTIMATING APPARATUS FOR PERMANENT MAGNET SYNCHRONOUS MOTOR DRIVING SYSTEM

(75) Inventor: An No Yoo, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 246 days.

(21) Appl. No.: 13/615,592

(22) Filed: Sep. 14, 2012

(65) Prior Publication Data

US 2013/0093370 A1    Apr. 18, 2013

(30) Foreign Application Priority Data

Oct. 12, 2011  (KR) .......................... 10-2011-0104297

(51) Int. Cl.
*H02P 21/00*   (2006.01)

(52) U.S. Cl.
USPC ...................................... 318/400.02; 318/700

(58) Field of Classification Search
USPC ........ 318/700, 400.02, 400.07, 727, 801, 802
See application file for complete search history.

(56) References Cited

U.S. PATENT DOCUMENTS

| | | | | |
|---|---|---|---|---|
| 6,163,128 A * | 12/2000 | Hiti et al. | ....................... | 318/722 |
| 6,727,675 B2 * | 4/2004 | Yoshimoto et al. | ........... | 318/700 |
| 6,954,050 B2 * | 10/2005 | Tobari et al. | ................... | 318/717 |
| 7,145,310 B2 * | 12/2006 | Ihm et al. | ...................... | 318/717 |
| 7,772,790 B2 * | 8/2010 | Nashiki | .................... | 318/400.02 |

FOREIGN PATENT DOCUMENTS

| | | |
|---|---|---|
| JP | 2009-240125 | 10/2009 |
| JP | 2010-279220 | 12/2010 |
| JP | 2011-041343 | 2/2011 |

* cited by examiner

*Primary Examiner* — Rina Duda
(74) *Attorney, Agent, or Firm* — Lee, Hong, Degerman, Kang & Waimey (57) ABSTRACT

A parameter estimating apparatus for permanent magnet synchronous motor driving system is disclosed, the apparatus estimating an inductance and a magnet flux linkage of a permanent magnet through a real-time magnetic flux estimation, whereby an operation performance of the PMSM can be enhanced.

12 Claims, 7 Drawing Sheets

PARAMETER ESTIMATING APPARATUS FOR PERMANENT MAGNET SYNCHRONOUS MOTOR DRIVING SYSTEM

Pursuant to 35 U.S.C. §119 (a), this application claims the benefit of earlier filing date and right of priority to Korean Patent Application No. 10-2011-0104297, filed on Oct. 12, 2011, the contents of which is hereby incorporated by reference in their entirety.

BACKGROUND OF THE DISCLOSURE

1. Field of Endeavor

The present disclosure relates to parameter estimation, and more particularly to a parameter estimating apparatus for permanent magnet synchronous motor driving system.

2. Background

This section provides background information related to the present disclosure which is not necessarily prior art.

Permanent magnet synchronous machines (PMSMs) driven by voltage inverters are generally operated under a speed control mode or a torque control mode. The PMSMs used for the speed control mode may include such industrial fields as hoist fields including elevators and cranes, and variable speed operation fields including fans and pumps. The PMSMs used for the torque control mode may include such industrial fields as traction motors for electric vehicles.

A difference may occur between a torque outputted by an inverter and an actually outputted torque, because a magnetic flux is saturated according to load situation in the PMSM. Now, a driving system of a PMSM according to prior art will be described with reference to the accompanying drawings.

Figure 1:
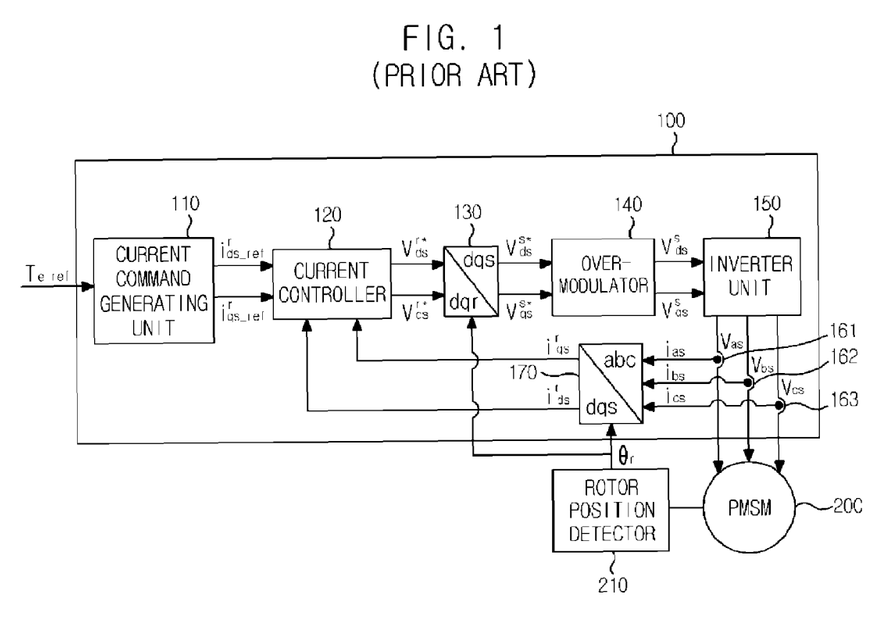
FIG. 1 is a structural view of a PMSM driving system according to prior art.

FIG. 1 is a schematic diagram illustrating a PMSM according to prior art, where a PMSM driving system is illustrated that is driven by an inverter in which a vector control independently controlling a magnetic flux current and a torque current is realized.

Referring to FIG. 1, the PMSM driving system according to prior art includes an inverter (100), a PMSM (200) and a rotor position detector (210). The inverter (100) receives a reference torque to output voltages for driving the PMSM (200) in response to the reference torque.

The rotor of the PMSM (200) is attached with the rotor position detector (210) to calculate or measure rotor position and rotor velocity. The rotor position and rotor velocity calculated or measured by the rotor position detector (210) is used for coordination conversion by coordinate converters (130, 170). A current command generator (110) outputs a current command of synchronous reference frame. A current controller (120) serving to control the current command, outputs d/q axis voltage of the synchronous reference frame.

A coordinate converter (130) uses the rotor position information received from the rotor position detector (210) to convert an output voltage of the current controller (120) to a voltage of a stationary reference frame. An over-modulator (140) functions to convert the output voltage of the coordinate converter (130) to a voltage that can be combined by an inverter unit (150).

The inverter unit (150) is a voltage type inverter including a power semiconductor, and applies command torque-tracing voltages to the PMSM (200).

Current sensors (161 to 163) measure a phase current between the PMSM (200) and the inverter unit (150), and the current measured by the current sensors (161 to 163) is coordinate-converted by the coordinate converter (170) and fed-back to the current controller (120).

Now, the PMSM system of FIG. 1 will be described.

A torque of the PMSM (200) may be obtained by the following Equation 1:

$$T_e = \frac{3}{2}\frac{P}{2}\lambda_{ds}^r i_{qs}^r - \lambda_{qs}^r i_{ds}^r \quad [\text{Equation 1}]$$

where, an superscript 'r' represents a parameter of a synchronous reference frame, and a subscript 's' is a parameter of stationary reference frame, P represents the number of poles of a motor, $\lambda_{ds}^r$, $\lambda_{qs}^r$ are rotor magnetic fluxes of d/q axis synchronous reference frame on the stationary reference frame, and $i_{ds}^r$, $i_{qs}^r$ are currents of d/q axis stationary reference frame on the synchronous reference frame, where magnetic flux of rotor on d/q axis the synchronous reference frame may be defined by the following Equations:

$$\lambda_{ds}^r = L_{ds} i_{ds}^r + \lambda_f \quad [\text{Equation 2}]$$

$$\lambda_{qs}^r = L_{qs} i_{qs}^r \quad [\text{Equation 3}]$$

where, $L_{ds}$ and $L_{qs}$ respectively represent d/q axis inductance on synchronous reference frame, $\lambda_f$ represents a magnet flux linkage by a permanent magnet.

If Equations 2 and 3 are plugged into Equation 1, a torque of the PMSM (200) may be expressed by the following Equation 4:

$$T_e = \frac{3}{2}\frac{P}{2}[(L_{ds}-L_{qs})i_{ds}^r + \lambda_f]i_{qs}^r \quad [\text{Equation 4}]$$

As noted from the Equation 4, the torque of the PMSM (200) is influenced by the d/q axis inductance and the magnet flux linkage of the permanent magnet, A command generator (110) generates d/q axis current command on synchronous reference frame using relation between command torque and Equation 4. A voltage equation of the synchronous reference frame of the PMSM (200) may be obtained by the following Equations.

$$V_{ds}^r = R_s i_{ds}^r + L_{ds}\frac{d i_{ds}^r}{dt} - \omega_r \lambda_{qs}^r \quad [\text{Equation 5}]$$

$$V_{qs}^r = R_s i_{qs}^r + L_{qs}\frac{d i_{qs}^r}{dt} + \omega_r \lambda_{ds}^r \quad [\text{Equation 6}]$$

where, $\omega_r$ is an electrical angle velocity, $V_{ds}^r$ and $V_{qs}^r$ and d/q axis voltage on the synchronous reference frame, and $R_s$ is a phase resistance on the synchronous reference frame.

The current command generated by the current command generator (110) and feedback current of the coordinate converter (170) are inputted to the current controller (120). The current controller (120) is a proportional and integral regulator, and combines an output voltage in the following manners.

$$V_{ds}^{r*} = \left(K_{pd} + \frac{K_{id}}{s}\right)(i_{ds\_ref}^r - i_{ds}^r) - \omega_r \hat{\lambda}_{qs}^r \quad [\text{Equation 7}]$$

$$V_{qs}^{r*} = \left(K_{pq} + \frac{K_{iq}}{s}\right)(i_{qs\_ref}^r - i_{qs}^r) + \omega_r \hat{\lambda}_{ds}^r \quad [\text{Equation 8}]$$

where, $\hat{\lambda}_{ds}^r$ and $\hat{\lambda}_{qs}^r$ are d/q axis magnetic flux estimated on the synchronous reference frame.

The coordinate converter (130) converts the output voltage on the synchronous reference frame by the current controller (120) to a voltage of stationary reference frame, where the converted voltage is provided as under:

$$V_{ds}^{s*} = V_{ds}^{r*}\cos\theta - V_{qs}^{r*}\sin\theta \qquad \text{[Equation 9]}$$

$$V_{qs}^{r*} = V_{ds}^{r*}\sin\theta + V_{qs}^{r*}\cos\theta \qquad \text{[Equation 10]}$$

The over-modulator (140) regulates the voltage of the coordinate converter (130) and outputs the regulated voltage so that a voltage command can be available within an inscribed circle of voltage restriction condition expressed in a hexagon on the stationary reference frame. The inverter unit (150) combines the following voltages from the output voltage of the over-modulator (140) and applies the voltage to the PMSM (200).

$$V_{as} = v_{ds}^s \qquad \text{[Equation 11]}$$

$$V_{bs} = -\frac{1}{2}V_{ds}^s + \frac{\sqrt{3}}{2}V_{qs}^s \qquad \text{[Equation 12]}$$

$$V_{cs} = -\frac{1}{2}V_{ds}^s - \frac{\sqrt{3}}{2}V_{qs}^s \qquad \text{[Equation 13]}$$

The current sensors (161~163) measure a phase current between the inverter unit (150) and the PMSM (200), convert the phase current to a current on the synchronous reference frame, and feedback the current to the current controller (120).

$$i_{ds}^s = \frac{2i_{as} - i_{bs} - i_{cs}}{3} \qquad \text{[Equation 14]}$$

$$i_{qs}^s = \frac{i_{bs} - i_{cs}}{2} \qquad \text{[Equation 15]}$$

$$i_{ds}^r = i_{ds}^s\cos\theta + i_{qs}^s\sin\theta \qquad \text{[Equation 16]}$$

$$i_{qs}^r = -i_{ds}^s\sin\theta + i_{qs}^s\cos\theta \qquad \text{[Equation 17]}$$

However, the PMSM (200) is saturated in magnetic flux according to load condition to generate a difference between the torque to be outputted by the inverter (100) and the actually outputted torque, the explanation of which has been described above.

That is, the driving of the PMSM (200) as in FIG. 1 is problematic in that performance decreases in terms of torque control, if inductance of the PMSM (200) or magnetic flux linkage by the permanent magnet is saturated according to load condition, because the d/q axis current command on the synchronous reference frame is calculated by the torque command.

SUMMARY OF THE DISCLOSURE

This section provides a general summary of the disclosure, and is not a comprehensive disclosure of its full scope or all of its features.

Accordingly, embodiments of the present disclosure may relate to a parameter estimating apparatus for permanent magnet synchronous motor driving system that may substantially obviate one or more of the above disadvantages due to limitations and disadvantages of related art, and it is therefore an object of the present disclosure to provide a parameter estimating apparatus for permanent magnet synchronous motor driving system configured to estimate a magnetic flux linkage by inductance and a permanent magnet through a real time flux estimation, whereby a PMSM driving performance can be enhanced.

Technical problems to be solved by the present disclosure are not restricted to the above-mentioned, and any other technical problems not mentioned so far will be clearly appreciated from the following description by skilled in the art.

In one general aspect of the present disclosure, there is provided a parameter estimating apparatus for permanent magnet synchronous motor driving system, the apparatus including a current command generating unit generating a current command on a synchronous reference frame from a torque command, a current controller generating a voltage on the synchronous reference frame using a rotor position of a PMSM (Permanent Magnet Synchronous Machine) from the current command, a first coordinate converter converting an output of the current controller on the synchronous reference frame to an output on stationary reference frame, an over-modulator limiting the output of the first coordinate converter to within a predetermined range and outputting the limited output, an inverter unit applying a voltage command tracing the command torque to the PMSM, and a second coordinate converter converting a phase current outputted from the inverter unit on the stationary reference frame to a phase current on the synchronous reference frame, the apparatus comprising: a first estimating unit estimating a d-axis magnetic flux and a q-axis magnetic flux on a synchronous reference frame, using the output voltage of the over-modulator, the phase current from the second coordinate converter, and the rotor position; a second estimating unit estimating a q-axis inductance on the synchronous reference frame using the q-axis magnetic flux from the first estimating unit; and a third estimating unit estimating a d-axis inductance on the synchronous reference frame using the d-axis magnetic flux from the first estimating unit, wherein a current command is generated, using, by the current command generating unit, the q-axis inductance and d-axis inductance from the second and third estimating units.

Preferably, but not necessarily, the second estimating unit comprises a first determining unit determining the q-axis inductance from the q-axis magnetic flux estimated by the first estimating unit, a first compensating unit compensating a difference between the first determining unit and a first adding unit using any one of a proportional gain and a proportional and integral gain, a first integrating unit integrating an output of the first compensating unit, and the first adding unit adding an output of the first integrating unit to an initially-set q-axis inductance.

Preferably, but not necessarily, the second estimating unit further comprises a first limiting unit limiting an output of the first adding unit to within predetermined maximum and minimum value.

Preferably, but not necessarily, the third estimating unit comprises a second determining unit determining the d-axis inductance from the d-axis magnetic flux estimated by the first estimating unit, a second compensating unit compensating a difference between the second determining unit and a second adding unit using any one of a proportional gain and a proportional integral gain, a second integrating unit integrating an output of the second compensating unit, and the second adding unit adding an output of the second integrating unit to the initially-set q-axis inductance.

Preferably, but not necessarily, the third estimating unit further comprises a second limiting unit limiting an output of the second adding unit to within predetermined maximum and minimum value.

Preferably, but not necessarily, the second determining unit is such that a magnet flux linkage is defined by a constant value.

In one general aspect of the present disclosure, there is provided a parameter estimating apparatus for permanent magnet synchronous motor driving system, the apparatus including a current command generating unit generating a current command on a synchronous reference frame from a torque command, a current controller generating a voltage on the synchronous reference frame using a rotor position of a PMSM from the current command, a first coordinate converter converting an output of the current controller on the synchronous reference frame to an output on stationary reference frame, an over-modulator limiting the output of the first coordinate converter to within a predetermined range and outputting the limited output, an inverter unit applying a voltage command tracing the command torque to the PMSM, and a second coordinate converter converting a phase current outputted from the inverter unit on the stationary reference frame to a phase current on the synchronous reference frame, the apparatus comprising: a first estimating unit estimating a d-axis magnetic flux and a q-axis magnetic flux on a synchronous reference frame, using the output voltage of the over-modulator, the phase current from the second coordinate converter, and the rotor position; a second estimating unit estimating a q-axis inductance on the synchronous reference frame using the q-axis magnetic flux from the first estimating unit; and a third estimating unit estimating a magnet flux linkage of a permanent magnet, using the d-axis magnetic flux from the first estimating unit, wherein a current command is generated, using, by the current command generating unit, the q-axis inductance and the magnet flux linkage of the permanent magnet from the second and third estimating units.

Preferably, but not necessarily, the second estimating unit comprises a first determining unit determining the q-axis inductance from the q-axis magnetic flux estimated by the first estimating unit, a first compensating unit compensating a difference between the first determining unit and a first adding unit using any one of a proportional gain and a proportional integral gain, a first integrating unit integrating an output of the first compensating unit, and the first adding unit adding an output of the first integrating unit to an initially-set q-axis inductance.

Preferably, but not necessarily, the second estimating unit further comprises a first limiting unit limiting an output of the first adding unit to within predetermined maximum and minimum value.

Preferably, but not necessarily, the third estimating unit comprises a second determining unit determining the magnet flux linkage of the permanent magnet from the q-axis magnetic flux estimated by the first estimating unit, a second compensating unit compensating a difference between the second determining unit and a second adding unit, using any one of a proportional gain and a proportional integral gain, a second integrating unit integrating an output of the second compensating unit, and the second adding unit adding an output of the second integrating unit to the initially-set magnet flux linkage of the permanent magnet.

Preferably, but not necessarily, the third estimating unit further comprises a second limiting unit limiting an output of the second adding unit to within predetermined maximum and minimum value.

Preferably, but not necessarily, the second determining unit is such that a magnet flux linkage is defined by a constant value.

The parameter estimating apparatus for permanent magnet synchronous motor driving system according to the present disclosure has an advantageous effect in that a real time magnetic flux is estimated to estimate a magnet flux linkage of a permanent magnet, whereby an operation performance of the PMSM can be enhanced.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

The disclosed embodiments and advantages thereof are best understood by referring to FIGS. 1-7 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. In addition, the terms "-er", "-or", "part" and "module" described in the specification mean units for processing at least one function and operation and can be implemented by hardware components or software components, and combinations thereof.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, a parameter estimating apparatus for permanent magnet synchronous motor driving system according to the present disclosure will be described in detail with reference to the accompanying drawings.

Figure 2:
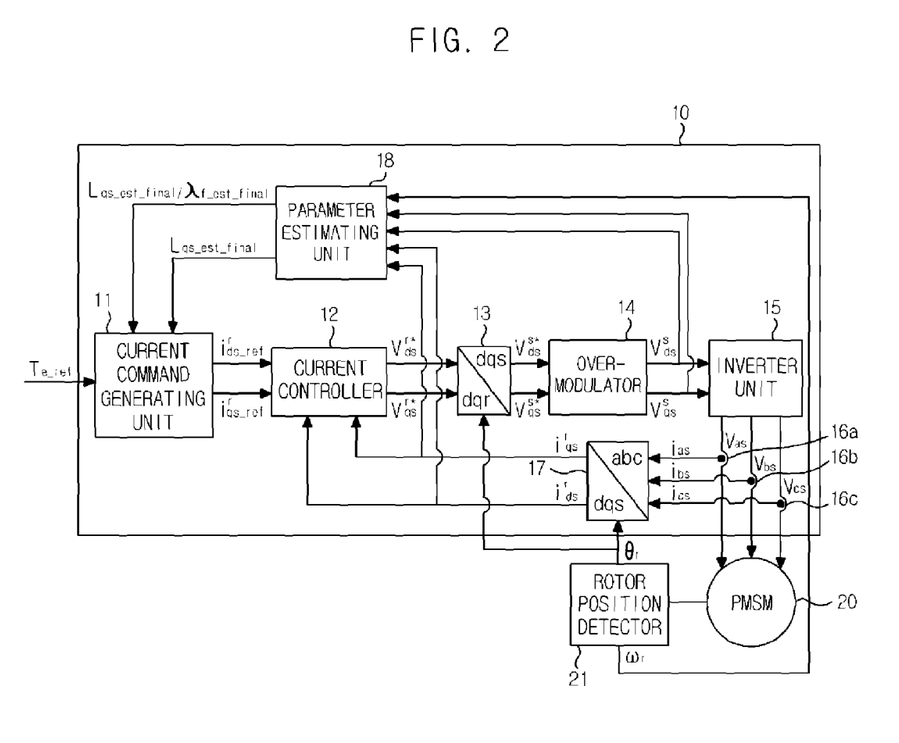
FIG. 2 is a structural view illustrating a PMSM driving system according to an exemplary embodiment of the present disclosure.

FIG. 2 is a structural view illustrating a PMSM driving system according to an exemplary embodiment of the present disclosure, where the PMSM driving system driven by an inverter including a parameter estimating apparatus is illustrated.

Referring to FIG. 2, the PMSM driving system includes an inverter (10), a PMSM (20) and a rotor position detector (21). The inverter (10) includes a current command generator (11), a current controller (12), a first coordinate converter (13), an over-modulator (14), an inverter unit (15), current sensors (16a to 16c), a second coordinate converter (17) and a parameter estimating unit (18).

The inverter (10) receives a reference torque to output voltages ($V_{as}$, $V_{bs}$, $V_{cs}$) for driving the PMSM (20) in response to the reference torque.

The rotor of the PMSM (20) is attached with the rotor position detector (21) to calculate or measure rotor position and rotor velocity. The rotor position measured by the rotor position detector (21) is used for coordination conversion by the first and second coordinate converters (13, 17). The current command generator (11) generates d/q axis current command on the synchronous reference frame from the reference torque, and updates an inductance from the parameter estimating unit (18) and magnet flux linkage information of a permanent magnet to generate d/q axis current command.

The current controller (12) controlling the current command outputted by the current command generator (11) outputs the d/q axis voltage on a synchronous reference frame. The first coordinate converter (13) uses the rotor position information obtained by the rotor position detector (21) to convert the output voltage of the current controller (12) to a voltage on a stationary reference frame. The over-modulator (14) converts the output voltage of the first coordinate converter (13) to a voltage combinable by the inverter unit (15).

The inverter unit (150) is preferably a voltage type inverter including a power semiconductor such as an IGBT (Insulated Gate Bipolar Transistor) or a MOSFET (Metal Oxide Semiconductor Field Effect Transistor), and applies reference torque-tracing voltages ($V_{as}$, $V_{bs}$, $V_{cs}$) to the PMSM (20).

The current sensors (16a to 16c) measure a phase current of PMSM (20) between the PMSM (20) and the inverter unit (15), and the current measured by the current sensors (16a-16c) is feedback to the current controller (12).

The second coordinate converter (17) converts the current on the stationary reference frame measured by the current sensors (16a to 16c) to current on the synchronous reference frame and transmits the current to the current controller (12).

The parameter estimating unit (18) receives the output voltage of the over-modulator (14), the phase current of the second coordinate converter (17) and rotor position detected by the rotor position detector (21) to estimate a magnetic flux used by the current controller (12), and estimates the d/q axis inductance estimated by the synchronous reference frame, the magnet flux linkage of the permanent magnet or the q-axis inductance by using the estimated magnetic flux, and transmits the estimation to the current command generator (11).

Figure 3:
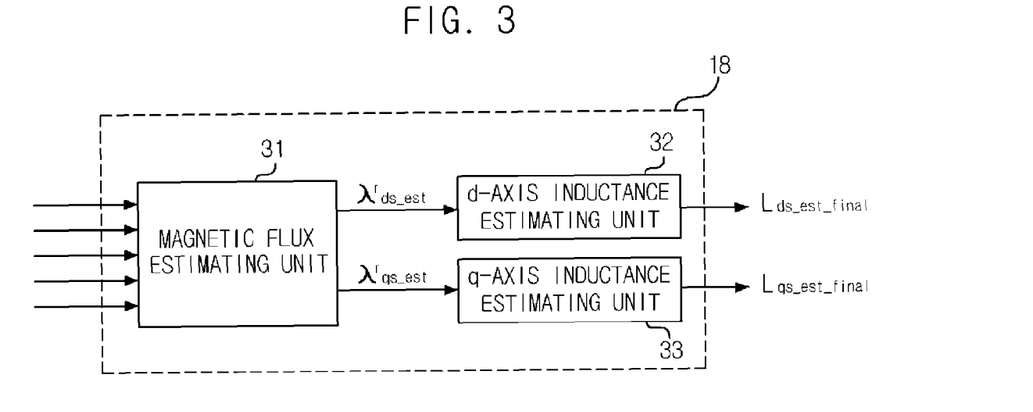
FIG. 3 is a detailed structural view illustrating a parameter estimating apparatus of FIG. 2 according to an exemplary embodiment of the present disclosure.

FIG. 3 is a detailed structural view illustrating a parameter estimating apparatus of FIG. 2 according to an exemplary embodiment of the present disclosure.

Referring to FIG. 3, the parameter estimating unit (18) according to the present disclosure includes a magnetic flux estimating unit (31), a d-axis inductance estimating unit (32) and a q-axis inductance estimating unit (33).

The magnetic flux estimating unit (31) receives the output voltage of the over-modulator (14), the phase current of the second coordinate converter (17) and rotor position detected by the rotor position detector (21) to estimate a magnetic flux used by the current controller (12), and explanation of which will be provided in the following. A voltage equation of the PMSM (20) under a normal state may be defined as follows:

$$V_{ds}^r = R_s i_{ds}^r - \omega_r \lambda_{qs}^r \quad \text{[Equation 18]}$$

$$V_{qs}^r = R_s i_{qs}^r + \omega_r \lambda_{ds}^r \quad \text{[Equation 19]}$$

Furthermore, the current controller (12) is preferably a proportional and integral controller to combine the output voltage as under:

$$V_{ds}^{r*} = \left(K_{pd} + \frac{K_{id}}{s}\right)(i_{ds\_ref}^r - i_{ds}^r) - \omega_r \hat{\lambda}_{qs}^r \quad \text{[Equation 20]}$$

$$V_{qs}^{r*} = \left(K_{pq} + \frac{K_{iq}}{s}\right)(i_{qs\_ref}^r - i_{qs}^r) + \omega_r \hat{\lambda}_{ds}^r \quad \text{[Equation 21]}$$

Equations 20 and 21 are outputted as final output voltages via the first coordinate converter (13) and the over-modulator (14) of FIG. 2.

Because the output voltage of the current controller (12) generates only the coordinate voltage under a situation where no over-modulation is generated, the output voltage of the current controller (12) is same as each voltage expressed by the Equations 21 and 22, if the voltage combined by the inverter unit (15) is converted to that of synchronous reference frame.

That is, under a normal state performed by the current controller, the output voltage of the current controller (12) becomes identical to the voltage equation of the PMSM (20), which enables to obtain the following relationship.

$$\left(K_{pd} + \frac{K_{id}}{s}\right)(i^r_{ds\_ref} - i^r_{ds}) - \omega_r \hat{\lambda}^r_{ds} = R_s i^r_{ds} - \omega_r \lambda^r_{qs} \quad \text{[Equation 22]}$$

$$\left(K_{pd} + \frac{K_{iq}}{s}\right)(i^r_{qs\_ref} - i^r_{qs}) + \omega_r \hat{\lambda}^r_{ds} = R_s i^r_{qs} + \omega_r \lambda^r_{ds} \quad \text{[Equation 23]}$$

An error of magnetic flux used by the current controller (12) can be obtained using the Equations 22 and 23.

$$\Delta \lambda^r_{ds} = \lambda^r_{ds} - \hat{\lambda}^r_{ds} = \frac{1}{\omega_r}\left[\left(K_{pq} + \frac{K_{iq}}{s}\right)(i^r_{qs\_ref} - i^r_{qs}) - R_s i^r_{qs}\right] \quad \text{[Equation 24]}$$

$$\Delta \lambda^r_{qs} = \lambda^r_{qs} - \hat{\lambda}^r_{qs} = \frac{1}{\omega_r}\left[\left(K_{pd} + \frac{K_{id}}{s}\right)(i^r_{ds\_ref} - i^r_{ds}) - R_s i^r_{ds}\right] \quad \text{[Equation 25]}$$

Thus, the parameter estimating unit (18) can estimate d/q axis magnetic flux using the following Equations 26 and 27.

$$\lambda^r_{ds\_est} = \frac{s^2}{s^2 + K_1 s + K_2} \lambda^r_{ds\_est\_volt} + \frac{K_1 s + K_2}{s^2 + K_1 s + K_2}(\lambda^r_{ds\_est\_cur} + \Delta \lambda^r_{ds}) \quad \text{[Equation 26]}$$

$$\lambda^r_{qs\_est} = \frac{s^2}{s^2 + K_1 s + K_2} \lambda^r_{qs\_est\_volt} + \frac{K_1 s + K_2}{s^2 + K_1 s + K_2}(\lambda^r_{qs\_est\_cur} + \Delta \lambda^r_{qs}) \quad \text{[Equation 27]}$$

where, $\lambda^r_{ds\_est\_volt}$, $\lambda^r_{qs\_est\_volt}$, $\lambda^r_{ds\_est\_cur}$ and $\lambda^r_{qs\_est\_cur}$ are respectively defined as under:

$$\lambda^r_{ds\_est\_volt} = \frac{1}{s}(V^s_{ds} - R_s i^s_{ds}) \quad \text{[Equation 28]}$$

$$\lambda^r_{qs\_est\_volt} = \frac{1}{s}(V^s_{qs} - R_s i^s_{qs}) \quad \text{[Equation 29]}$$

$$\lambda^r_{ds\_est\_cur} = \hat{L}_{ds} i^r_{ds} + \hat{\lambda}_f \quad \text{[Equation 30]}$$

$$\lambda^r_{qs\_est\_cur} = \hat{L}_{ds} i^r_{qs} \quad \text{[Equation 31]}$$

A d-axis inductance estimating unit (32) and a q-axis inductance estimating unit (33) estimate d/q-axis inductances respectively using the magnetic flux estimated by using Equations 26 and 27. At this time, a magnet flux linkage of the permanent magnet is assumed as a constant value in the exemplary embodiment of the parameter estimating unit (18) of the present disclosure.

Figure 4:
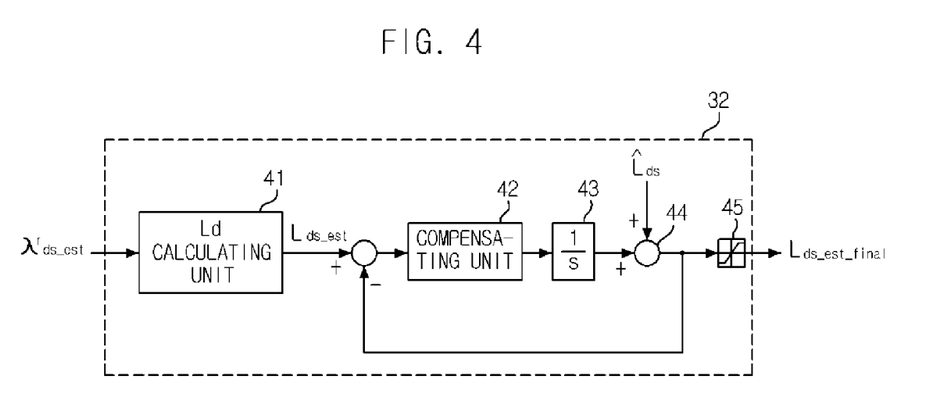
FIG. 4 is a detailed structural view illustrating a d-axis inductance estimating unit of FIG. 3 according to an exemplary embodiment of the present disclosure.
Figure 5:
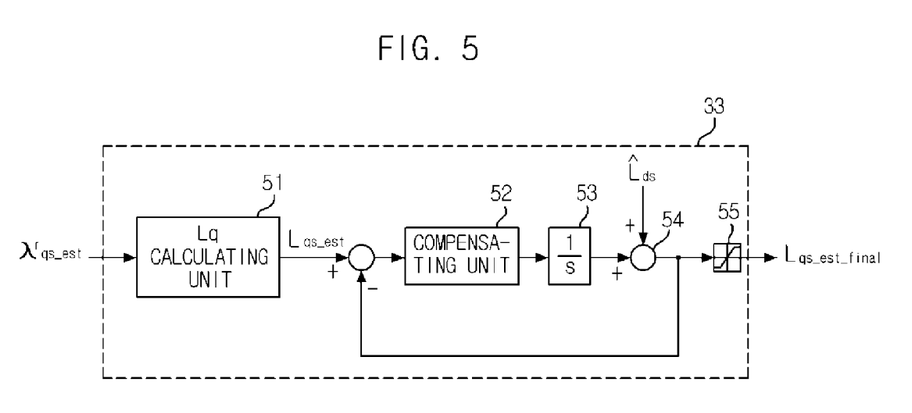
FIG. 5 is a detailed structural view illustrating a q-axis inductance estimating unit of FIG. 3 according to an exemplary embodiment of the present disclosure.

FIG. 4 is a detailed structural view illustrating a d-axis inductance estimating unit (32) of FIG. 3 according to an exemplary embodiment of the present disclosure, and FIG. 5 is a detailed structural view illustrating a q-axis inductance estimating unit (33) of FIG. 3 according to an exemplary embodiment of the present disclosure.

The d/q axis inductance estimating units (32, 33) use the magnetic flux estimated by the magnetic flux estimating unit (31) to estimate d/q axis inductances respectively.

Referring to FIGS. 4 and 5, the d-axis inductance estimating unit (32) according to the present disclosure includes an Ld calculating unit (41), a compensating unit (42), an integrating unit (43), an adding unit (44) and a limiting unit (45), and the q-axis inductance estimating unit (33) includes an Lq calculating unit (51), a compensating unit (52), an integrating unit (53), an adding unit (54) and a limiting unit (55).

First, the d-axis inductance estimating unit (32) will be described.

The Ld calculating unit (41) obtains a d-axis inductance from the d-axis magnetic flux (Equation 26) estimated by the magnetic flux estimating unit (31). At this time, the d-axis inductance can be obtained using Equation 2.

The compensating unit (42) compensates a difference between the Ld calculating unit (41) and the adding unit (44) using a proportional gain or a proportional and integral gain.

The integrating unit (43) integrates an output of the compensating unit (42), and the adding unit (44) combines an initially-set inductance and an output of the integrating unit (43). The limiting unit (45) limits the estimated d-axis inductance to within a maximum value and a minimum value.

Now, the q-axis inductance estimating unit (33) will be described.

The Lq calculating unit (51) obtains a q-axis inductance from the q-axis magnetic flux (Equation 27) estimated by the magnetic flux estimating unit (31). At this time, the q-axis inductance can be obtained using Equation 1.

The compensating unit (52) compensates a difference between the Lq calculating unit (51) and the adding unit (54) using a proportional gain or a proportional and integral gain.

The integrating unit (53) integrates an output of the compensating unit (52), and the adding unit (54) combines an initially-set inductance and an output of the integrating unit (53). The limiting unit (55) limits the estimated q-axis inductance to within a maximum value and a minimum value.

As noted above, the parameter estimating unit (18) for the PMSM driving system according to the present disclosure uses the output voltage of the over-modulator (14), the phase current of the second coordinate converter (17) and rotor position of the rotor position detector (21) to estimate the magnetic flux of the current controller (12), through which the inductance can be obtained, whereby performance robust to parameter changes can be obtained, through which torque linearity can be guaranteed during torque control of the PMSM.

Meanwhile, in a case changes in d-axis inductance of the PMSM (20) is small, and changes in magnet flux linkage by permanent magnet is great, the parameter estimating unit (18) according to the present disclosure may also estimate the magnet flux linkage by the permanent magnet, using the d-axis inductance as a constant value.

Figure 6:
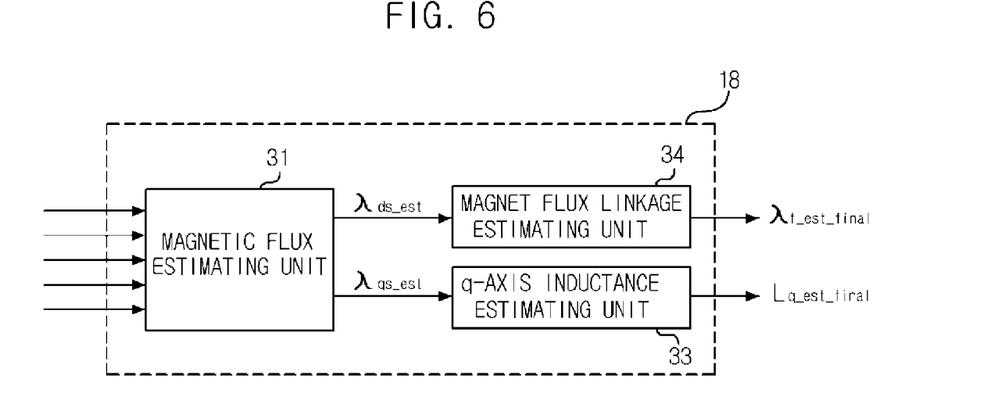
FIG. 6 is a detailed structural view illustrating a parameter estimating apparatus of FIG. 2 according to another exemplary embodiment of the present disclosure.

FIG. 6 is a detailed structural view illustrating a parameter estimating apparatus of FIG. 2 according to another exemplary embodiment of the present disclosure.

Referring to FIG. 6, the parameter estimating unit (18) according to the present disclosure includes a magnetic flux estimating unit (31), a magnet flux linkage estimating unit by a permanent magnet (illustrated as "magnet flux linkage estimating unit" in the figure, 34) and a q-axis inductance estimating unit (33). The operation of the magnetic flux estimating unit (31) and the q-axis inductance estimating unit (33) has been already explained above, such that no more elaboration thereto will be provided as functions are identical.

Figure 7:
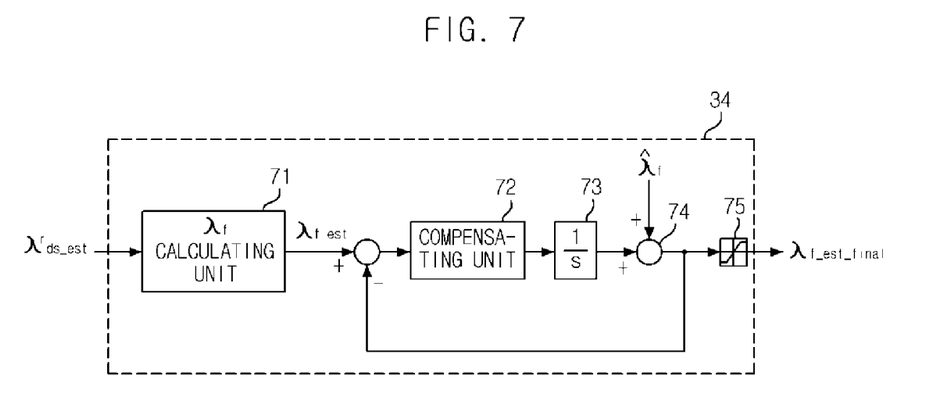
FIG. 7 is a detailed structural view illustrating a magnet flux linkage of permanent magnet of FIG. 6 according to an exemplary embodiment of the present disclosure.

FIG. 7 is a detailed structural view illustrating the magnet flux linkage estimating unit (34) of permanent magnet of FIG. 6 according to an exemplary embodiment of the present disclosure.

Referring to FIG. 7, the magnet flux linkage estimating unit (34) of permanent magnet includes a $\lambda_f$ calculating unit (71), a compensating unit (72), an integrating unit (73), an adding unit (74) and a limiting unit (75).

The $\lambda_f$ calculating unit (71) obtains a magnet flux linkage $\lambda_f$ by a permanent magnet from the d-axis magnetic flux (Equation 26) estimated by the magnetic flux estimating unit (31). At this time, the d-axis inductance can be obtained using Equation 2.

The compensating unit (73) compensates a difference between the $\lambda_f$ calculating unit (71) and the adding unit (74) using a proportional gain or a proportional and integral gain.

The integrating unit (73) integrates an output of the compensating unit (72), and the adding unit (74) combines an initially-set inductance and an output of the integrating unit (73). The limiting unit (75) limits the magnet flux linkage by the permanent magnet to within a maximum value and a minimum value.

It can be noted from the foregoing that the parameter estimating unit (18) can estimate the magnetic flux of the current controller (12) to show robustness to parameter changes, whereby the PMSM driving system according to the present disclosure can guarantee torque linearity.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A parameter estimating apparatus for permanent magnet synchronous motor driving system, the apparatus including a current command generating unit generating a current command on a synchronous reference frame from a torque command, a current controller generating a voltage on the synchronous reference frame using a rotor position of a PMSM (Permanent Magnet Synchronous Machine) from the current command, a first coordinate converter converting an output of the current controller on the synchronous reference frame to an output on stationary reference frame, an over-modulator limiting the output of the first coordinate converter to within a predetermined range and outputting the limited output, an inverter unit applying a voltage command tracing the command torque to the PMSM, and a second coordinate converter converting a phase current outputted from the inverter unit on the stationary reference frame to a phase current on the synchronous reference frame, the apparatus comprising: a first estimating unit estimating a d-axis magnetic flux and a q-axis magnetic flux on a synchronous reference frame, using the output voltage of the over-modulator, the phase current from the second coordinate converter, and the rotor position; a second estimating unit estimating a q-axis inductance on the synchronous reference frame using the q-axis magnetic flux from the first estimating unit; and a third estimating unit estimating a d-axis inductance on the synchronous reference frame using the d-axis magnetic flux from the first estimating unit, wherein a current command is generated, using, by the current command generating unit, the q-axis inductance and d-axis inductance from the second and third estimating units.

2. The apparatus of claim 1, wherein the second estimating unit comprises: a first determining unit determining the q-axis inductance from the q-axis magnetic flux estimated by the first estimating unit; a first compensating unit compensating a difference between the first determining unit and a first adding unit using any one of a proportional gain and a proportional and integral gain; a first integrating unit integrating an output of the first compensating unit; and the first adding unit adding an output of the first integrating unit to an initially-set q-axis inductance.

3. The apparatus of claim 2, wherein the second estimating unit further comprises a first limiting unit limiting an output of the first adding unit to within predetermined maximum and minimum value.

4. The apparatus of claim 1, wherein the third estimating unit comprises: a second determining unit determining the d-axis inductance from the d-axis magnetic flux estimated by the first estimating unit; a second compensating unit compensating a difference between the second determining unit and a second adding unit using any one of a proportional gain and a proportional integral gain; a second integrating unit integrating an output of the second compensating unit; and the second adding unit adding an output of the second integrating unit to the initially-set q-axis inductance.

5. The apparatus of claim 4, wherein the third estimating unit further comprises a second limiting unit limiting an output of the second adding unit to within predetermined maximum and minimum value.

6. The apparatus of claim 4, wherein the second determining unit is such that a magnet flux linkage is defined by a constant value.

7. A parameter estimating apparatus for permanent magnet synchronous motor driving system, the apparatus including a current command generating unit generating a current command on a synchronous reference frame from a torque command, a current controller generating a voltage on the synchronous reference frame using a rotor position of a PMSM from the current command, a first coordinate converter converting an output of the current controller on the synchronous reference frame to an output on stationary reference frame, an over-modulator limiting the output of the first coordinate converter to within a predetermined range and outputting the limited output, an inverter unit applying a voltage command tracing the command torque to the PMSM, and a second coordinate converter converting a phase current outputted from the inverter unit on the stationary reference frame to a phase current on the synchronous reference frame, the apparatus comprising: a first estimating unit estimating a d-axis magnetic flux and a q-axis magnetic flux on a synchronous reference frame, using the output voltage of the over-modulator, the phase current from the second coordinate converter, and the rotor position; a second estimating unit estimating a q-axis inductance on the synchronous reference frame using the q-axis magnetic flux from the first estimating unit; and a third estimating unit estimating a magnet flux linkage of a permanent magnet, using the d-axis magnetic flux from the first estimating unit, wherein a current command is generated, using, by the current command generating unit, the q-axis inductance and the magnet flux linkage of the permanent magnet from the second and third estimating units.

8. The apparatus of claim 7, wherein the second estimating unit comprises: a first determining unit determining the q-axis inductance from the q-axis magnetic flux estimated by the first estimating unit; a first compensating unit compensating a difference between the first determining unit and a first adding unit using any one of a proportional gain and a proportional integral gain; a first integrating unit integrating an output of the first compensating unit; and the first adding unit adding an output of the first integrating unit to an initially-set q-axis inductance.

9. The apparatus of claim 8, wherein the second estimating unit further includes a first limiting unit limiting an output of the first adding unit to within predetermined maximum and minimum value.

10. The apparatus of claim 7, wherein the third estimating unit comprises: a second determining unit determining the magnet flux linkage of the permanent magnet from the q-axis magnetic flux estimated by the first estimating unit; a second compensating unit compensating a difference between the second determining unit and a second adding unit, using any one of a proportional gain and a proportional integral gain; a second integrating unit integrating an output of the second compensating unit; and the second adding unit adding an output of the second integrating unit to the initially-set magnet flux linkage of the permanent magnet.

11. The apparatus of claim 10, wherein the third estimating unit further includes a second limiting unit limiting an output of the second adding unit to within predetermined maximum and minimum value.

12. The apparatus of claim 10, wherein the second determining unit is such that a magnet flux linkage is defined by a constant value.

* * * * *